RADIO ALARM SYSTEM HAVING PRESELECTED CODE SEQUENCES

Filed July 3, 1963 2 Sheets-Sheet 1

INVENTOR.
Glenn G. Van Burkleo,
BY John B Davidson
ATTORNEY.

Jan. 18, 1966 G. G. VAN BURKLEO 3,230,454

RADIO ALARM SYSTEM HAVING PRESELECTED CODE SEQUENCES

Filed July 3, 1963

2 Sheets-Sheet 2

INVENTOR.

Glenn G. VanBurkleo,

BY John B. Davidson

ATTORNEY.

United States Patent Office
3,230,454
Patented Jan. 18, 1966

3,230,454
RADIO ALARM SYSTEM HAVING PRESELECTED CODE SEQUENCES

Glenn G. Van Burkleo, Houston, Tex., assignor, by mesne assignments, to Esso Production Research Company, Houston, Tex., a corporation of Delaware
Filed July 3, 1963, Ser. No. 292,544
5 Claims. (Cl. 325—166)

This invention is related generally to alarm systems, and more particularly to systems for keying a radio transmitter according to preselected code sequences in accordance with a plurality of alarm conditions.

In certain industrial applications requiring unattended pumping or condition monitoring installations, the installations are serviced by mobile repair units. Manifestly, it is advantageous to have a warning system such that fault conditions at any of the stations can be instantly transmitted to the mobile repair unit so that the personnel of the repair unit can service the fault condition as soon as possible. To this end it is desirable to have the fault conditions transmitted to the mobile repair unit through a radio link. Electrical signals indicative of the fault conditions can be transmitted to a central radio transmitting location via land line or another radio link, and relayed by radio to the mobile repair unit.

Federal Communications Commission Rules and Regulations relating to transmission of radio alarm signals on mobile frequencies limit such signaling to not more than five transmissions, no transmission to exceed six seconds duration, with no two transmissions commencing in the same 60-second period. The rules also require that the transmitter be automatically deactivated and manually reset if, due to a malfunction, the transmitter remains on for a period in excess of three minutes and that the power input to the final radio frequency stage be reduced to 50 watts when an alarm signal is being transmitted.

Figure 1:
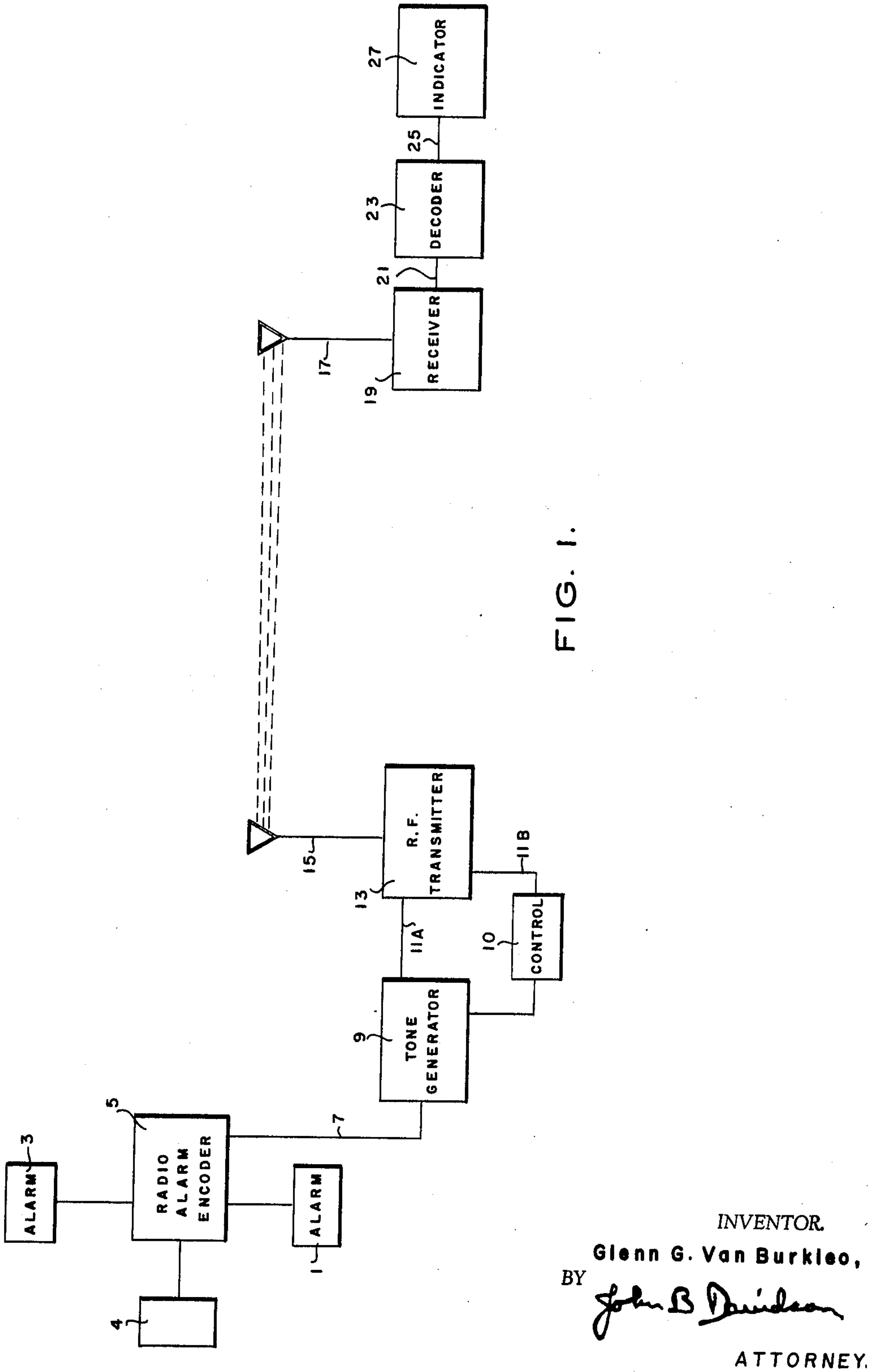
Figure 2:
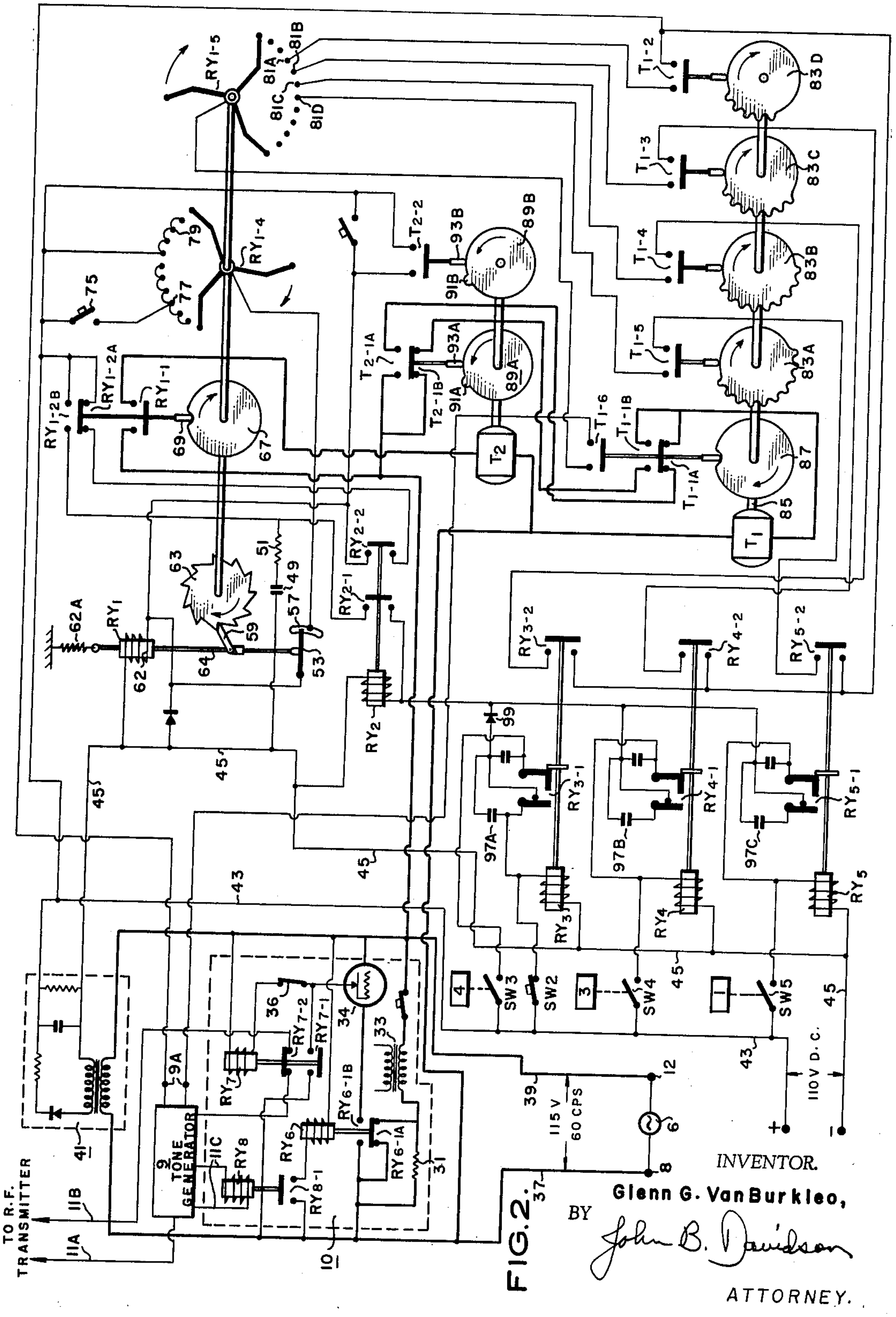

Objects and features of the invention not apparent from the above discussion will become evident upon consideration of the following detailed description of the invention taken in connection with the accompanying drawing, wherein:

FIG. 1 is a block diagram of a radio alarm system in accordance with the invention; and FIG. 2 is an electrical schematic diagram of a radio alarm encoder and radio frequency transmitter code system in accordance with the invention.

With reference now to FIG. 1, there is shown a radio frequency transmitter 13 having a transmitting antenna 15, and a radio receiver 19 having a receiving antenna 17 and adapted to receive signals transmitted thereto from the transmitter 13. The radio frequency transmitter 13 is tone-modulated by a tone generator 9 connected to the transmitter by leads 11A and 11B. The tone generator also activates the radio frequency transmitter through power control apparatus 10 adapted to energize the power circuits of the transmitter 13 responsive to activation of the tone generator 9, and to de-energize the radio frequency transmitter 13 responsive to fault conditions that may arise due to a malfunction of power control equipment. The tone generator 9 is keyed by a radio alarm encoder 5, which will be described in more detail with reference to FIG. 2. The radio alarm encoder 5 is connected to tone generator 9 by leads 7, and is adapted to key or activate tone generator 9 according to predetermined code sequences responsive to alarm signals from fault detecting devices 1, 3, and 4.

The radio frequency signals transmitted to receiver 19 from transmitter 13 are detected by receiver 19 so as to produce pulsed electrical signals on leads 21, which are identical to the signals transmitted to tone generator 9 from alarm encoder 5. These signals are decoded by decoding device 23 and are presented on a visual or audio indicator 27 to warn operating personnel that a fault condition exists. The decoder 23 may be a device such as manufactured by Secode Corporation, of San Francisco, California, Model No. RPD–M4F.

With reference now to FIG. 2, there is shown in detail the circuit diagram of radio alarm encoder 5 and power control circuit 10, and the interconnections thereof with tone generator 9 and fault detecting devices 1, 3, and 4. The tone generator 9 is shown in block form and may be a device manufactured by Secode Corporation, of San Francisco, California, Model TGS–720. The tone generator is keyed by electrical pulses applied to terminals 9A and produces an output signal of predetermined frequency (e.g., 2805 c.p.s.) on lead 11A to radio frequency transmitter 13 in accordance with the electrical pulses appearing at terminals 9A. Furthermore, whenever the tone generator is activated by signals applied to terminals 9A, an output signal appearing on leads 11C is applied to an activating winding of relay $RY_8$ in power control circuit 10. This in turn closes contacts $RY_{8-1}$ to energize the actuating winding of relay $RY_6$ by completing a circuit between lines 37 and 39, which are energized from an alternating current source 6 having output terminals 8, 10. Actuation of relay $RY_6$ opens contacts $RY_{6-1A}$ and closes contacts $RY_{6-1B}$. Resistor 31 thus is placed in series with the primary winding of transformer 33, which supplies power to the radio frequency transmitter. In this manner the power output of the transmitter is reduced to prepare the transmitter for tone keying.

Closure of contacts $RY_{6-1B}$ energizes a thermal time delay device 34. In the event that a failure of one of the component parts of the equipment to be described results in the radio frequency transmitter being activated for a period of more than three minutes, thermal time delay device 34 will complete a circuit through the actuating winding of relay $RY_7$, switch 36, and contacts $RY_{6-1B}$ to pick up relay $RY_7$, thus opening contacts $RY_{7-2}$ and closing contacts $RY_{7-1}$. The opening of contacts $RY_{7-2}$ serves to de-energize a circuit connected to radio frequency transmitter 13 through line 11B to turn off the radio frequency transmitter. Line 11B may activate a relay controlling a power circuit in one of the stages of the radio frequency transmitter. This a a technique well known to the art and will not be further discussed herein. The closure of contacts $RY_{7-1}$ serves to energize winding $RY_7$ after thermal delay device 34 has opened until switch 36 is manually opened.

The operation and construction of the radio alarm encoder 5 will be best understood from a description of the operating sequence of the component parts thereof. However, before entering into a discussion of the operating sequence, it is well at this point to describe the construction and operation of certain of the individual parts of the apparatus. Relay $RY_2$ is a conventional telephone-type relay having two normally-open contacts that are closed when the actuating winding thereof is energized. Fault relays $RY_3$, $RY_4$, and $RY_5$ are of a more specialized type wherein one contact is closed when the actuating winding is energized, and the other contact is only momentarily closed upon energization of the actuating winding. Relays $RY_3$, $RY_4$, and $RY_5$ may be Series BQA relays manufactured by Automatic Electric Company, of North Lake, Illinois. Stepping switch $RY_1$ may be of the type manufactured by Automatic Electric Company and designated Type 44. The stepping switch has at least two sets of wiper arms adapted to sequentially engage contacts associated therewith responsive to actuation of the stepping switch winding 62 thereof. The stepping switch is provided with a ratchet mechanism including a ratchet wheel 63, and a pivoted pawl 59 affixed to magnet armature 64 and adapted to engage the teeth of the ratchet wheel in the usual manner to step the ratchet wheel through a predetermined angle with each energization of the actuating winding 62 of the stepping switch. Further affixed to the stepping switch $RY_1$ is a switch including pivoted contact member 53 and fixed contact member 57 adapted to momentarily open a circuit upon each energization of the actuating winding 62. The stepping switch is further provided with a cam-actuated switching mechanism including cam 67, normally-open contact $RY_{1-1}$ and $RY_{1-2B}$, and normally-closed contact $RY_{1-2A}$. The indentation 69 in the camming surface marks the normal position of the cam.

The timer motors designated $T_1$ and $T_2$ are for the purpose of driving cam wheels that respectively actuate a multiplicity of contacts according to predetermined different code sequences, and control switches for opening and closing appropriate circuits. The timer motor $T_1$ revolves at a much faster speed than does timer motor $T_2$. In a typical embodiment of the invention, timer motor $T_1$ revolves at the rate of ten revolutions per minute, and timer motor $T_2$ revolves at the rate of one revolution per minute. As illustrated, timer motor $T_1$ includes four code wheels for generating different pulse codes, and one cam for actuating normally-closed switch contacts $T_{1-1A}$ and normally-open switch contacts $T_{1-1B}$ and $T_{1-6}$. Cam surface 89A driven by timer motor $T_2$ has a protuberance 91A on the camming surface thereof for actuating switch member 93A to close normally-open contacts $T_{2-1A}$ and open normally-closed contacts $T_{2-1B}$. (Manifestly, the wheels may have indentures rather than protuberances provided that contacts $T_{1-2}$, $T_{1-3}$, $T_{1-4}$, and $T_{1-5}$ are normally closed.) Likewise, cam 89B has a protuberance 91B on the camming surface thereof for actuating switch member 93B to close contacts $T_{2-2}$ in synchronism with the actuation of switch member 93A.

Direct current for the operation of the system is supplied from alternating current lines 37, 39 through power supply 41. The direct current is fed to busses 43, 45 from the output of power supply 41.

Fault condition sensing devices 1, 3, and 4 respectively actuate switches SW5, and SW4, and SW3 upon detection of an alarm condition. The alarm sensing devices may be responsive to temperature, pressure, presence or lack of electrical current, or any other condition capable of exhibiting an abnormality.

The operation of the apparatus will be described assuming that the various components are in the normal conditions shown in the drawing. Assume now that an abnormal condition is detected by fault condition sensing device 1 to close switch SW5. The actuating winding of relay $RY_5$ is thereby connected across busses 43, 45 to actuate relay $RY_5$. Contact $RY_{5-2}$ is closed for as long as the fault condition exists. Contacts $RY_{5-1}$ are momentarily closed so that a pluse of current flows through the actuating winding of relay $RY_2$. (The purpose of capacitors 97A, 97B, and 97C is to extend the duration of the current pulse produced as the result of the closure of contacts $RY_{3-1}$, $RY_{4-1}$, and $RY_{5-1}$, respectively.) Energization of the actuating winding of relay $RY_2$ momentarily closes normally-open contacts $RY_{2-1}$ and $RY_{2-2}$. Closure of relay contacts $RY_{2-2}$ completes a circuit through contacts $RY_{1-2A}$ and the actuating winding 62 of stepping switch $RY_1$. Relay $RY_2$ de-energizes and opens contacts $RY_{2-2}$ which de-energize winding 62. Restoring spring 62A advances the ratchet wheel 63 by one step. Cam 67 is rotated to close contacts $RY_{1-1}$ and complete a circuit through the windings of timing motor $T_2$ from buss 37 to buss 39. The closure of contacts $RY_{1-2B}$ prepares a circuit from buss 43 to buss 45 through contacts $RY_{2-1}$ to hold relay $RY_2$ in its actuated position should a second fault signal be received during the alarm transmitting sequence.

Timing motor $T_2$ begins revolving as soon as its winding is energized. When protuberance 91A actuates switch member 93A, the resultant closure of contact $T_{2-1A}$ energizes the winding of timing motor $T_1$ through contact $T_{1-1A}$. Immediately, contact $T_{1-1B}$ is closed and timing motor $T_1$ ceases to revolve, awaiting passage of protuberance 91A beyond switch member 93A. After this occurs, contacts $T_{2-1B}$ close and the winding of motor $T_1$ is again energized and motor $T_1$ begins to revolve. When the stepping switch $RY_1$ is actuated through one step, as described above, the contact arms of switches $RY_{1-4}$ and $RY_{1-5}$ engage open contacts. The two blank positions allow proper synchronization of motor $T_1$ and motor $T_2$ from any position of desynchronization. As contact $T_{2-2}$ is closed at one-minute intervals by timing motor $T_2$, a circuit is momentarily completed through winding 62 to again step the stepping switch through one more step. The above sequence continues until one of the contact arms of switch $RY_{1-4}$ engages one of contacts 77, and one of the contact arms of relay switch $RY_{1-5}$ engages contact 81A. On the next revolution of motor $T_1$, a circuit is completed between contacts 9A through switch $RY_{1-5}$ and switch $T_{1-2}$ so that tone generator 9 is keyed in accordance with the closures of switch $T_{1-2}$ by the protuberances on cam wheel 83B. The pulse code produced by switch $T_{1-2}$ is used to clear the receiving end indicating apparatus of any alarm signals previously detected thereby.

On the next two steps of the stepping switch, switch $RY_{1-5}$ will engage contacts 81B and 81C. However, since contacts $RY_{3-2}$ and $RY_{4-2}$ are open, there will be no circuit closure such as will produce signal indications at terminals 9A. On the next succeeding step, however, the arm of switch $RY_{1-5}$ will engage contact 81D. Since contacts $RY_{5-2}$ and $T_{1-6}$ are closed, closure of contact $T_{1-5}$ in accordance with the protuberances on cam wheel 83A will successively close the circuit between terminals 9A to activate the tone generator and produce a coded tone signal for modulating radio frequency transmitter 13. The coded signals received by receiver 19 will be decoded by decoder 23 to produce an alarm indication on indicator 27.

On the next step of the stepping switch, the contact arm of switch $RY_{1-4}$ will engage the first of contacts 79. In effect, this short circuits contacts $T_{2-2}$. Inasmuch as contacts 79 are connected together, the stepping switch will be successively pulsed as the result of the making and breaking of the switch including members 53 and 57 so that the stepping switch rapidly steps around to its initial position, opening contacts $RY_{1-1}$ and $RY_{1-2B}$ and closing contact $RY_{1-2A}$. The operating sequence of the mechanism is now at an end. The apparatus is now in its initial position.

The circuit elements associated with relay $RY_3$ are required if sensor 4 is responsive to a momentary radio signal warning of a fault condition at a remote location. Switch SW3 is closed, actuating relay $RY_3$ to close normally-open switches $RY_{3-1}$ and $RY_{3-2}$. Contact $RY_{3-1}$ functions to energize the actuating winding of relay $RY_3$ after switch SW3 is opened. The operating sequence of the apparatus is the same as described above when relay $RY_3$ is actuated, with the exception that switch $T_{1-3}$ (actuated by wheel 83C) functions to repetitively close the keying circuit across terminals 9A to key tone generator 9. To cause relay $RY_3$ to drop out after an alarm condition has been corrected, switch SW2 must be manually opened. The function of diode 99 is to prevent actuation of relay $RY_3$ when contacts $RY_{2-1}$, $RY_{4-1}$, or $RY_{5-1}$ are closed.

Should there be a change in alarm status during an encoder operating sequence, such as could be occasioned by closure of switch SW4 during a sequence initiated by closure of switch SW5, relay $RY_2$ will lock up through its contact $RY_{2-1}$ and cam-operated stepping switch contact $RY_{1-2B}$. Restoration of the stepping switch to its initial position will open contacts $RY_{1-2B}$ and close contacts $RY_{1-2A}$. However, relay $RY_2$ is rather slow acting on release because of the incorporation of capacitor 49 and resistor 51 in parallel with the actuating winding thereof through contacts $RY_{2-1}$. Therefore, before relay $RY_2$ allows contacts $RY_{2-2}$ to open, the actuating winding 62 will receive current through contacts $RY_{2-2}$ and $RY_{1-2A}$. When relay $RY_2$ is released a few milliseconds later, the actuating winding 62 is de-energized and the stepping switch steps out of its initial position, thereby initiating a new cycle. On the new cycle, three pulse code sequences will be produced, resetting receiver indicators and indicating two alarm conditions. However, if no change in alarm status occurs during an encoder cycle, then relay $RY_2$ does not lock up, and the stepping switch $RY_1$ remains in the initial position thereof until some change does occur.

When it is desired to prevent alarm signals from being transmitted without deactivating the radio transmitter, it is only necessary to close switch 75. This, in effect, short-circuits switch $T_{2-2}$ so that winding 62 is repetitively pulsed to step stepping switch $RY_1$ back to its initial position.

The apparatus described above is quite simple and effective in transmitting alarm signals to a mobile unit through a radio link. The apparatus conforms with Federal Communications Commission regulations in all respects.

Objects and features of the invention having been completely described and illustrated, what it is desired to claim is:

1. Apparatus for actuating a radio transmitter keying means responsive to alarm conditions, comprising:

electrical terminal means for connection to the radio transmitter keying means;

electrical supply means for supplying electrical current;

first electrical motor means, and a plurality of coded cam wheels connected thereto for rotation thereby;

a plurality of first electrical contact means individually connected to said cam wheels for closure thereby in accordance with the codes thereof upon rotation thereof by said first motor means;

a plurality of fault relay means corresponding to said cam wheels, each having second and third normally-open contact means thereon, said first and second contact means of corresponding cam wheel and fault relay means being connected in series circuit relationship;

stepping switch means for sequentially connecting said serially connected first and second contact means to said electrical terminal means for completing an electrical circuit to actuate the radio transmitter keying means;

stepping means, including actuating winding means, for stepping said stepping switch means to successive positions thereof responsive to successive electrical energizations of said actuating winding means;

switch actuating cam means connected to said first motor means for rotation with said coded cam wheels;

cam actuated switch means having fourth normally-open and fifth normally-closed contact means thereon, adapted to close said fourth contact means and open said fifth contact means when said first motor means is rotating said coded cam wheels;

second electrical motor means, and second cam means connected thereto for rotation thereby;

switch means including sixth and seventh normally-open contact means and eighth normally-closed contact means, operatively connected to said second cam means for simultaneous momentary closure of said sixth and seventh contact means and opening of said eighth contact means with every rotation of said second cam means by said second motor means;

said fifth and sixth contact means being in series circuit relationship with said first motor means across said electrical supply means for energizing said first motor means upon simultaneous closure thereof;

said fourth and eighth contact means being connected in series circuit relationship with said first motor means across said electrical supply means to energize said first motor means upon simultaneous closure thereof;

said seventh contact means being serially connected with said actuating winding means across said electrical supply means for momentary energization of said actuating winding means upon momentary closure of said seventh contact means;

homing switch means, including ninth and tenth normally-open contact means and eleventh normally-closed contact means;

control relay means having a relay winding and twelfth and thirteenth normally-open contact means;

serially connected capacitor means and resistor means connected in parallel with said control relay winding through said twelfth contact means;

said actuating winding means and said eleventh and thirteenth contact means being serially connected across said electrical supply means for actuation of said stepping means;

said capacitor and resistor means being serially connected with said ninth contact means across said electrical supply means for energization of said control relay winding upon closure of said twelfth contact means;

circuit means, including said third contact means, connected to said electrical supply means and said control relay winding for momentary energization of said control relay winding upon closure of said third contact means;

said eleventh contact means and said second motor means being serially connected across said electrical supply means for energization of said second motor means upon closure of said tenth contact means; and fault detecting means connected to said fault relay means for individual actuation of said fault relay means responsive to fault conditions.

2. Apparatus for actuating a radio tranmitter keying means responsive to alarm conditions, comprising:

first electrical terminal means for connection to the radio transmitter keying means;

second electrical terminal means for connection to an electrical power source;

first electrical control means, including a plurality of first contact means, adapted to close said first contact means according to different predetermined code sequences when actauted through an operating cycle thereof by electrical energization thereof;

a plurality of fault relay means individually corresponding to individual ones of said first contact means, each having second and third normally-open contact means thereon, corresponding second contact means and first contact means being connected in series circuit relationship;

stepping switch means for sequentially connecting said serially connected first and second contact means to said first electrical terminal means when stepped to successive positions thereof for completing an electrical circuit to actuate the radio transmitter keying means;

stepping means, including actuating winding means, for stepping said stepping switch means to successive positions thereof responsive to successive electrical energizations of said actuating winding means;

switch actuating cam means connected to said first electrical control means, for repetitive movement through an operating cycle thereof by said first electrical control means;

cam actuating switch means having fourth normally-open and fifth normally-closed contact means thereon adapted to close said fourth contact means and open said fifth contact means when said first electrical control means is actuating said cam means through an operating cycle thereof;

electrical cam actuating means and second cam means connected thereto for repetitive movement through an operating cycle thereof upon electrical energization thereof;

switch means including sixth and seventh normally-open contact means and eighth normally-closed contact means operatively connected to said second cam means for simultaneous momentary closure of said sixth and seventh contact means and opening of said eighth contact means with every movement of said second cam means through an operating cycle thereof;

said fifth and sixth contact means being in series circuit relationship with said first electrical control means across said second electrical terminal means for energizing said first electrical control means upon simultaneous closure thereof;

said fourth and eighth contact means being connected in series circuit relationship with said first electrical control means across said second electrical terminal means to electrically energize said first electrical control means upon simultaneous closure thereof;

said seventh contact means being serially connected with said actuating winding means across said second electrical terminal means for momentary energization of said actuating winding means upon momentary closure of said seventh contact means;

homing switch means, including ninth and tenth normally-open contact means and eleventh normally-closed contact means;

control relay means having a relay winding and twelfth and thirteenth normally-open contact means;

serially connected capacitor means and resistor means connected in parallel with said control relay winding through said twelfth contact means;

said actuating winding means and said eleventh and thirteenth contact means being serially connected across said second contact means for actuation of said stepping means;

said capacitor and resistor means being serially connected with said ninth contact means across said second electrical terminal means for energization of said control relay winding upon closure of said twelfth contact means;

circuit means, including said third contact means, connected to said second electrical terminal means and said control relay winding for momentary energization of said control relay winding upon closure of said third contact means;

said eleventh contact means and said electrical cam actuating means being serially connected across said second electrical terminal means for energization of said electrical cam actuating means upon closure of said tenth contact means; and fault detecting means connected to said fault relay means for individual actuation of said fault relay means responsive to fault conditions.

3. Apparatus for actuating a radio transmitter keying means responsive to alarm conditions, comprising:

electrical terminal means for connection to the radio transmitter keying means;

electrical supply means for supplying electrical current;

electrical motor means, and a plurality of coded cam wheels connected thereto for rotation thereby;

a plurality of first contact means individually connected to said cam wheels for closure thereby in accordance with the codes thereof upon rotation thereof by said motor means;

a plurality of fault relay means corresponding to said cam wheels, each having second and third normally-open contact means thereon, said first and second contact means of corresponding cam wheel and fault relay means being connected in series circuit relationship;

stepping switch means for sequentially connecting said serially connected first and second contact means to said electrical terminal means for completing an electrical circuit to actuate the radio transmitter keying means;

stepping means, including actuating winding means, for stepping said stepping switch means to successive positions thereof responsive to successive electrical energizations of said actuating winding means;

motor activating means connected to said motor means for activating said motor means through one rotation thereof responsive to each stepping activation of said stepping means;

means connected to said motor activating means for periodically momentarily energizing said actuating winding means;

homing switch means, including fourth and fifth normally-open contact means and sixth normally-closed contact means;

control relay means having a relay winding and seventh and eighth normally-open contact means;

serially connected capacitor means and resistor means connected in parallel with said control relay winding through said seventh contact means;

said actuating winding means and said sixth and eighth contact means being serially connected across said electrical supply means for actuation of said stepping means;

said capacitor and resistor means being serially connected with said fourth contact means across said electrical supply means for energization of said control relay winding upon closure of said seventh contact means;

circuit means, including said third contact means, connected to said electrical supply means and said control relay winding for momentary energization of said control relay winding upon closure of said third contact means;

said sixth contact means and said motor activating means being connected across said electrical supply means for energization of said motor activating means upon closure of said fourth contact means; and fault detecting means connected to said fault relay means for individual activation of said fault relay means responsive to fault conditions.

4. Apparatus for activating a radio transmitter keying means responsive to alarm conditions, comprising:

electrical terminal means for connection to the radio transmitter keying means;

electrical supply means for supplying electrical current;

electrical motor means, and a plurality of coded cam wheels connected thereto for rotation thereby;

a plurality of first contact means individually connected to said cam wheels for closure thereby in accordance with the codes thereof upon rotation thereof by said motor means;

a plurality of fault relay means adapted to be actuated by electrical signals coupled thereto indicative of fault conditions corresponding to said cam wheels, each having second and third normally-open contact means thereon, said first and second contact means of corresponding cam wheel and fault relay means being connected in series circuit relationship;

stepping switch means for sequentially connecting said serially connected first and second contact means to said electrical terminal means for completing an electrical circuit to actuate the radio transmitter keying means;

stepping means, including actuating winding means, for stepping said stepping switch means to successive positions thereof responsive to successive electrical energizations of said actuating winding means;

motor activating means connected to said motor means for activating said motor means through one rotation thereof responsive to each stepping activation of said stepping means;

means connected to said motor activating means for periodically momentarily energizing said actuating winding means;

homing switch means, including fourth and fifth normally-open contact means and sixth normally-closed contact means, control relay means having a relay winding and seventh and eighth normally-open contact means;

serially connected capacitor means and resistor means connected in parallel with said control relay winding through said seventh contact means;

said actuating winding means and said sixth and eighth contact means being serially connected across said electrical supply means for actuation of said stepping means;

said capacitor and resistor means being serially connected with said fourth contact means across said electrical supply means for energization of said control relay winding upon closure of said seventh contact means;

circuit means, including said third contact means, connected to said electrical supply means and said control relay winding for momentary energization of said control relay winding upon closure of said third contact means; and said sixth contact means and said motor activating means being connected across said electrical supply means for energization of said motor activating means upon closure of said fourth contact means.

5. Apparatus for actuating a radio transmitter keying means responsive to alarm conditions, comprising:

electrical terminal means for connection to the radio transmitter keying means;

electrical supply means for supplying electrical current;

electrical motor means, and a plurality of differently coded cam wheels connected thereto for rotation thereby;

a plurality of first contact means individually connected to said cam wheels for closure thereby in accordance with the codes thereof upon rotation thereof by said motor means;

a plurality of fault relay means adapted to be actuated by electrical signals coupled thereto indicative of fault conditions corresponding to said cam wheels, each having second and third normally-open contact means thereon, said first and second contact means of corresponding cam wheel and fault relay means being connected in series circuit relationship;

stepping switch means, including actuating winding means, for sequentially connecting said serially connected first and second contact means to said electrical terminal means for completing an electrical circuit to actuate the radio transmitter keying means;

means connected to said motor means for activating said motor means through one rotation thereof responsive to each stepping activation of said stepping switch means and for periodically momentarily energizing said actuating winding means;

homing switch means, including fourth and fifth normally-open contact means and sixth normally-closed contact means;

control relay means having a relay winding and seventh and eighth normally-open contact means;

serially connected capacitor means and resistor means connected in parallel with said control relay winding through said seventh contact means;

said actuating winding means and said sixth and eighth contact means being serially connected across said electrical supply means for actuation of said stepping switch means;

said capacitor and resistor means being serially connected with said fourth contact means across said electrical supply means for energization of said control relay winding upon closure of said seventh contact means;

circuit means, including said third contact means, connected to said electrical supply means and said control relay winding for momentary energization of said control relay winding upon closure of said third contact means; and said sixth contact means and said motor activating means being connected across said electrical supply means for energization of said motor activating means upon closure of said fourth contact means.

No references cited.

DAVID G. REDINBAUGH, *Primary Examiner.*